Patented July 14, 1953

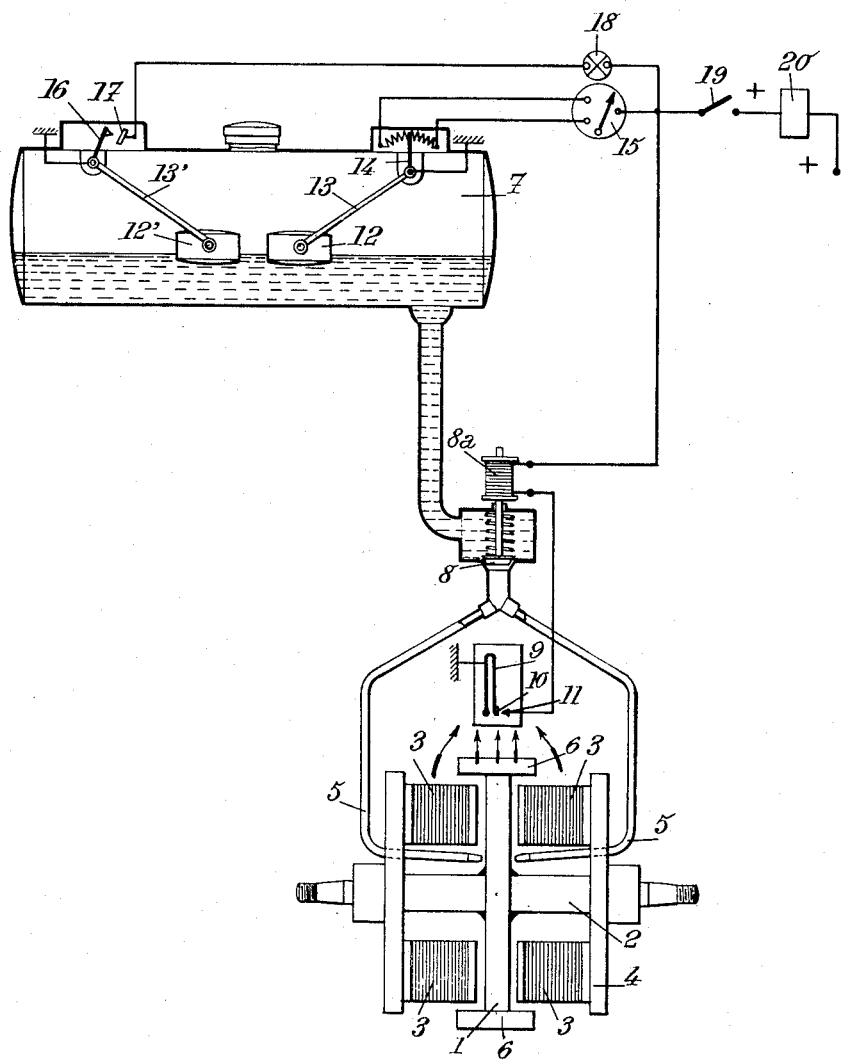

2,645,730

UNITED STATES PATENT OFFICE 2,645,730

COOLING SYSTEM FOR ELECTRIC BRAKES

Pierre Etienne Bessierè, Paris, France, assignor to Society Electro-Mecanique de l'Aveyron, Rodez (Aveyron), France, a society of France Application April 27, 1950, Serial No. 158,411
In France January 31, 1950

3 Claims. (Cl. 310—93)

The present invention relates to cooling systems for electric brakes in which a rotor, preferably made of a magnetic metal and rigid with a shaft to be braked, rotates in a magnetic field created during braking by a plurality of electromagnets inserted in an electric circuit, the braking effect being due to the Foucault currents thus induced in the rotor.

In the course of this braking action, these Foucault currents give off in the rotor a considerable amount of heat which, in order to avoid injury of the vital parts of the apparatus, must be quickly evacuated. This is why this type of apparatus is to be provided with efficient cooling means.

The chief object of my invention is to provide a cooling system for braking apparatus of the type above referred to which is better adapted to meet the requirements of practice than those used for the same purpose up to this time and in particular which preserves its efficiency in case of sharp increases of the braking action or when this action is intensive and last for a long time.

According to my invention, the cooling system, in addition to air cooling means arranged to act always on certain elements of the electric brake in action, includes means for reinforcing the cooling action exerted upon these elements by means of wasted water, these last mentioned means being automatically brought into play by thermostat means when these elements are heated, despite the action of the air cooling means, to a predetermined temperature, such that said water is wholly transformed into steam as it flows along said brake elements.

A preferred embodiment of my invention will be hereinafter described with reference to the accompanying drawings given merely by way of example and in which the only figure is a diagrammatical view, partly in elevation and partly in section, of an electric brake provided with a cooling system according to my invention.

The braking device includes a rotor 1 rigid with the shaft 2 to be braked and which rotates in an electric field created, during the braking action by a plurality of electro-magnets 3 carried in a fixed casing 4.

It should be noted that it is known to provide a device of this kind with an air cooling system. This air collects a portion of the heat created in the rotor and transmitted by conductibility or radiation to the adjoining parts, the air stream flowing for instance successively over the electro-magnets, the shaft and the walls of the rotor itself, which may be provided with blades so as to act as a fan to intensify the circulation of the cooling air stream.

The object of my invention is temporarily to increase the cooling action exerted on the brake, when the heat given off therein is very high, for instance in case of an intensive or very long braking action.

For this purpose, according to my invention, I combine with the air cooling means water cooling means acting on at least some of the air cooled parts and in particular on the rotor. Preferably water is projected onto the side walls of this rotor close to the shaft through conduits 5 and travels radially along said walls toward the periphery under the action of the centrifugal force, this water vaporizing and absorbing an important amount of heat before being finally discharged to the atmosphere in a continuous manner in the form of steam under the fan effect (blades 6) of the rotor.

As the reserve of water is limited and the brake is already provided with air cooling means which are sufficient in many cases, the water cooling means are to be used only temporarily, when the effect of the air cooling means is insufficient.

For this reason, according to a preferred embodiment of my invention, the system includes automatic control means for bringing the water cooling means into action only when the rotor temperature rises above a given value, or, what is tantamount to this, when the cooling air which leaves the brake reaches a given temperature. For instance, as shown by the drawing, the flow of cooling water from a tank 7 is controlled by a valve 8 operated by an electromagnet 8a and which is opened only when a thermostat, for instance a bimetallic strip 9, closes a contact 10—11. This thermostat is subjected to the action of the brake cooling air stream after passage thereof through the brake. When the brake is not applied, contact element 10, carried by the bimetallic strip, is located at a distance from fixed contact element 11. If, on the contrary, the brake is being applied, the cooling air stream which is flowing out from the brake, for instance in the direction of the arrows, under the fan effect of blades 6 heats bimetallic strip 9 so as to move contact element 10 toward contact element 11. The thermostat is adjusted in such manner that contact 10—11 is closed when the temperature of the air stream, and consequently that existing in the brake, reaches a value which requires the action of more intensive cooling means. Electro-magnet 8a is then energized and opens valve 8, which causes water to flow from tank 7 into conduits 5.

It should be noted that the automatic control means for bringing the water cooling means into play are not necessarily operated through electric means and that the thermostat might be operatively connected through suitable mechanical means with valve 8 to open it when the temperature in the brake reaches a predetermined value.

Tank 7 is advantageously fitted with gauging means for indicating the amount of water that remains at the disposal of the driver and with warning means arranged to give a signal when this amount becomes insufficient. For instance, the tank is fitted with a float 12 connected through a lever 13 with the movable contact 14 of a rheostat inserted in the circuit of an ammeter 15 the graduations of which indicate the number of litres remaining in tank 7. A second float 12' acts through a lever 13' on the movable element 16 of a contact 16—17 so as to close the electric circuit of a warning device 18, for instance a luminous signal, carried, same as ammeter 15, by the instrument board of the vehicle.

The above mentioned electric circuits are for instance supplied with current from the vehicle battery. In this case, the main switch 19 of the system will be inserted in series with the vehicle contact key 20 (or any other element the insertion of which makes it possible to start the vehicle engine). Switch 19 may also be connected in series with the control of the contactors which connect, for the application of the brake, the electro-magnets 3 of the brake with battery 20. I thus avoid any accidental opening of valve 8 when the vehicle is standing still or when it is running but the brake is not being applied.

In a general manner, while I have, in the above description, disclosed what I deem to be practical and efficient embodiments of my invention, it should be well understood that I do not wish to limited thereto as there might be changes made in the arrangement, disposition and form of the parts without departing from the principle of the present invention as comprehended within the scope of the accompanying claims.

What I claim is:

1. For use with an electric brake including a conductor rotor disc operatively connected with the part to be braked and fixed means on either side of said rotor disc and out of contact therewith for producing a magnetic field the lines of force of which intersect said rotor, a cooling system which comprises, in combination, air cooling means operatively connected with said rotor disc for permanently circulating an air stream from the atmosphere to the central part of said rotor disc and from said central part centripetally along said disc between its faces and said fixed means, water cooling means for projecting water onto the central part of said rotor, and means responsive to the temperature in said brake for automatically bringing said water cooling means into play when said temperature exceeds a predetermined value such that said water is wholly transformed into steam as it flows along said rotor disc.

2. For use with an electric brake including a magnetic metal rotor disc rigid with the part to be braked and fixed means on either side of said rotor disc and out of contact therewith for producing a magnetic field the lines of force of which intersect said rotor, a cooling system which comprises, in combination, air cooling means operatively connected with said rotor disc for permanently circulating an air stream from the atmosphere to the central part of said rotor disc and from said central part centripetally along said disc between its faces and said fixed means, a water tank, conduit means for leading water from said tank onto the central portion of said rotor, valve means interposed in said conduit means, and means responsive to the temperature of said brake for automatically opening said valve means when said temperature exceeds a predetermined value such that said water is wholly transformed into steam as it flows along said rotor disc.

3. An electric brake cooling system according to claim 2 in which the last mentioned means include an electric relay for operating said valve, an electric circuit for energizing said relay, a thermostat placed in the air stream flowing out from said brake, and a contact operated by said thermostat for closing said circuit.

PIERRE ETIENNE BESSIERÈ.

References Cited in the file of this patent

UNITED STATES PATENTS

| Number | Name | Date |
|---|---|---|
| 714,498 | Mailloux | Nov. 25, 1902 |
| 2,102,181 | McCormick | Dec. 14, 1937 |
| 2,195,130 | Hoyt | Mar. 26, 1940 |
| 2,298,725 | Rogowski | Oct. 13, 1942 |
| 2,400,225 | Eksergian | May 14, 1946 |
| 2,503,704 | Bessierè | Apr. 11, 1950 |

FOREIGN PATENTS

| Number | Country | Date |
|---|---|---|
| 415,198 | Germany | June 15, 1925 |
| 563,374 | Germany | Nov. 4, 1932 |